Figure 1:
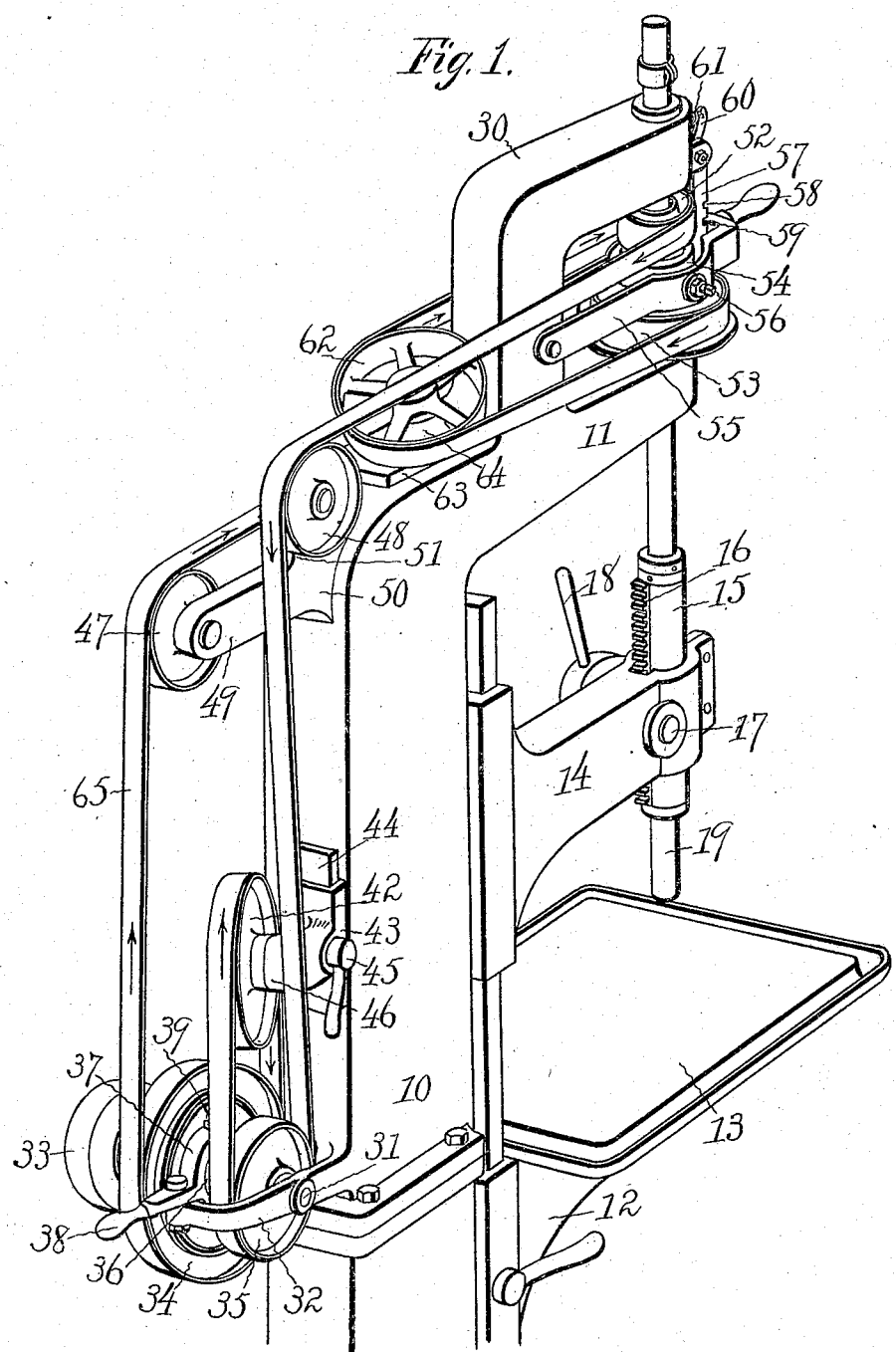

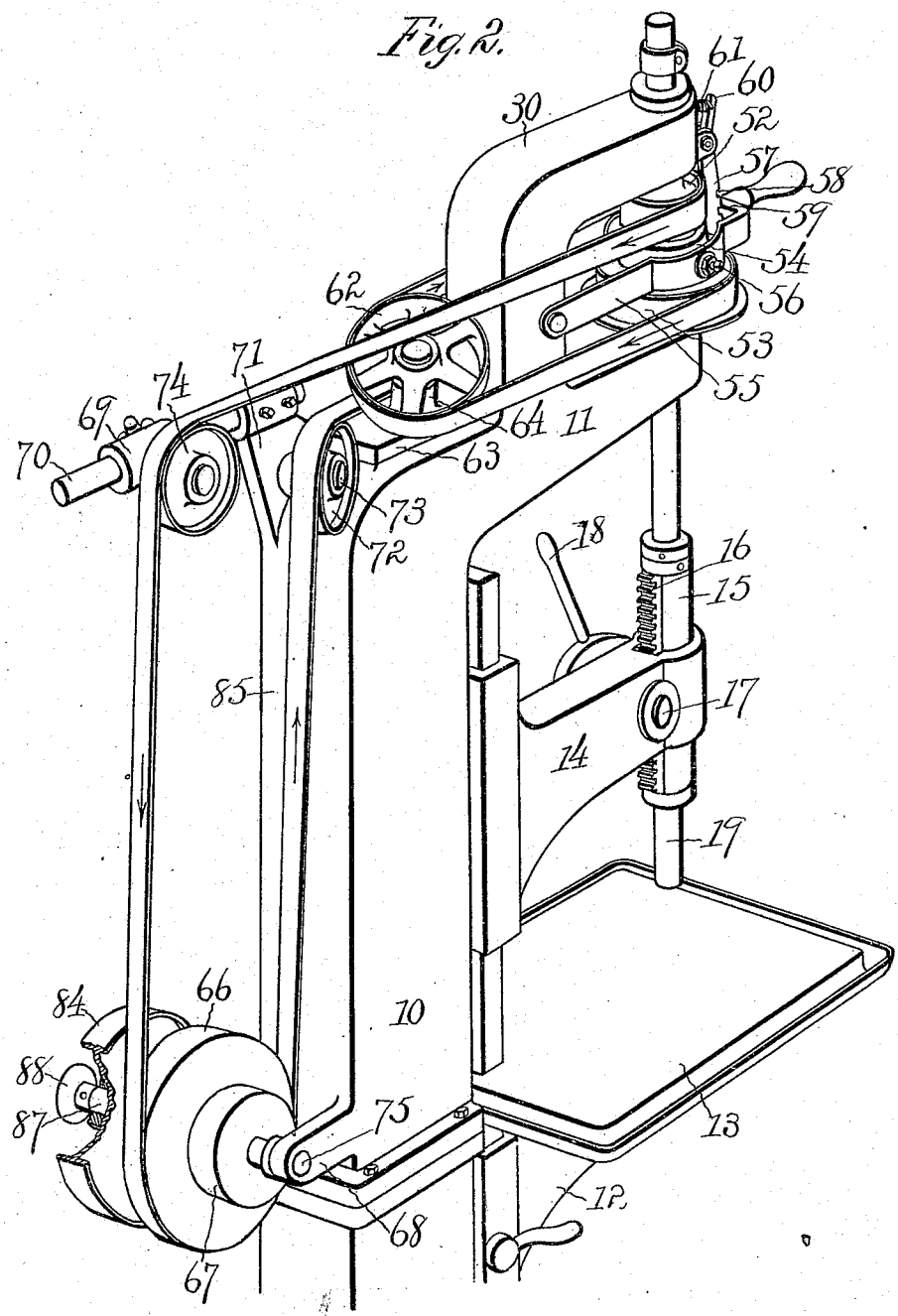

C. B. ELMORE.
CHANGE SPEED MECHANISM.
APPLICATION FILED NOV. 17, 1906.
941,506.
Patented Nov. 30, 1909
3 SHEETS—SHEET 3
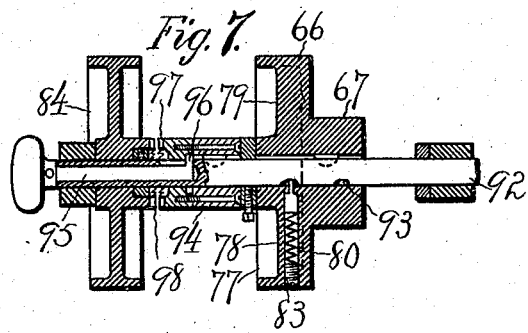
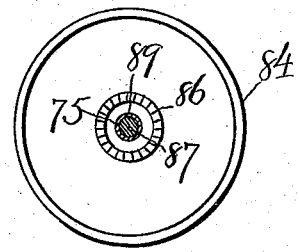
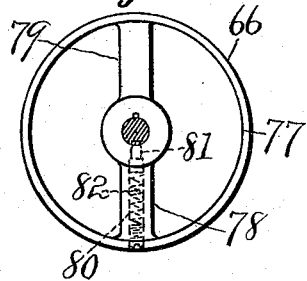
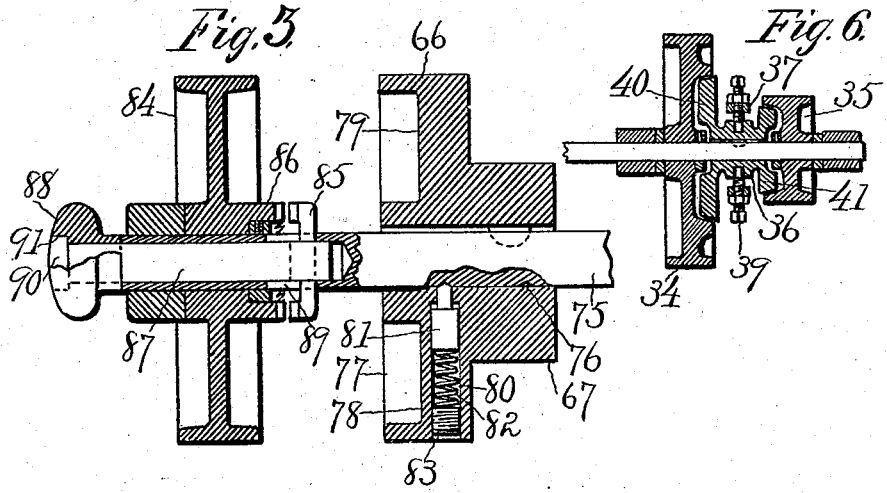
Witnesses:
F. H. Elliott
L. E. Berkovitch
Inventor:
Charles B. Elmore,
by Arthur B. Jenkins
Attorney.

UNITED STATES PATENT OFFICE.

CHARLES B. ELMORE, OF HARTFORD, CONNECTICUT, ASSIGNOR TO SAMUEL E. ELMORE, OF HARTFORD, CONNECTICUT.

CHANGE-SPEED MECHANISM.

941,506.  Specification of Letters Patent.  Patented Nov. 30, 1909.

Application filed November 17, 1906. Serial No. 343,861.

*To all whom it may concern:*

Be it known that I, CHARLES B. ELMORE, a citizen of the United States, and a resident of Hartford, in the county of Hartford and State of Connecticut, have invented a new and Improved Change-Speed Mechanism, of which the following is a specification.

My invention relates to the class of devices for imparting rotation at various speeds to a spindle, shaft or the like, such mechanism employing what is known as a step or cone pulley or pulleys and a belt or belts for transmitting the power, and the object of my invention is to provide such a device that shall be cheap in construction and effective in operation; and a further object of the invention is to provide a device in which the maximum amount of power shall be delivered to the driven shaft or spindle; and a further object of the invention is to provide means whereby change from one speed to another may be readily made.

A form of device in the use of which these objects may be attained is illustrated in the accompanying drawings, in which—

Figure 1 is a perspective view of a drill press embodying my invention. Fig. 2 is a perspective view of a portion of a drill press showing another arrangement of the belts appurtenant to the driving shaft. Fig. 3 is a view in vertical section through the driving shaft shown in Fig. 2. Fig. 4 is a face view of the driving pulley on said shaft, on reduced scale. Fig. 5 is a face view of the cone pulley thereon, on reduced scale. Fig. 6 is a view in vertical section through the driving shaft shown in Fig. 1, and illustrating a form of clutch applicable to all of the devices herein shown. Fig. 7 is a detail view showing a modified form of clutch.

My invention is applicable to any mechanism in which it is desired to obtain various speeds of a spindle or shaft by means of cone or step pulleys and belts, and as the device is especially adapted for driving the spindle of a drill press I have chosen such a machine as a means of illustration and description of the invention.

In the accompanying drawings the numeral 10 denotes the column of a drill press, the top 11 of which projects forward to support the drill spindle. A bracket 12, vertically adjustable, is mounted on slideways on the column and supports a table 13 upon which the work is placed. A spindle bracket 14, also vertically adjustable, is supported on slideways on the column, and receives a sleeve 15 having a rack 16 meshing with a gear (not shown) on the shaft 17, which is operated as by means of the handle 18. A drill spindle 19 is rotatably mounted in this sleeve, but receives longitudinal movement therefrom.

All of the parts just described are old and well-known, and the construction and operation will be readily understood by those skilled in the art, and a further and detailed description is deemed unnecessary herein.

In order to obtain different rates of speed of rotation of the drill spindle 19, cone pulleys located upon said spindle and upon the driving shaft, either or both, have been employed. In such constructions, when the driving belt is changed from one to another step of a pulley provision must be made to accommodate the length of the belt to the change in distance between the peripheries of the pulleys. In my improved construction I have eliminated the requirement for any change in the length of the belt when it is changed from one to another step of a pulley, in machines which have been in use prior to my invention, and while I employ what in effect is a cone pulley yet the construction does not embody such a pulley, as it is strictly understood, in my improved construction the steps of the pulley being separated. I in fact provide two pulleys of different diameters.

The numerals under 20 have been used herein to denote those parts of the machine which are of old and well-known construction, while the numerals from 30 upward are hereafter employed to denote the novel parts of my improved machine.

An upward and forward extending arm 30 from the forward projecting part 11 is so located with respect to the latter as to form a bearing for the upper or outer end of the drill spindle 19. This additional bearing is found of importance owing to the location of the pulleys for driving the spindle at a considerable distance from the projection 11.

A driving shaft 31 is mounted on the upright part 10 of the column, in the form shown this shaft being supported by a frame 32 extending from the upright, its end being formed to support a clutch shifting lever to be hereinafter described. A similar projection, but without the clutch support, extends from the opposite side of the upright 10, this portion of the frame not being shown in the drawings, as it is obscured by one of the pulleys, but its location and construction are similar to that shown. A driving pulley 33 is secured to the shaft 31 as a means of driving the latter.

A large pulley 34 and a smaller pulley 35 are each loosely mounted on the shaft 31. A clutch 36 is mounted between the two pulleys, and a yoke 37 connected with the clutch operating lever 38 affords means for shifting the clutch.

I have shown and described herein a friction clutch for connecting the two pulleys, but it will be readily understood that any of the well-known forms of clutches may be employed and that the invention is not necessarily limited to a friction clutch. A form of friction clutch which is applicable to the pulleys just described, as well as to the pulleys hereinafter described in connection with the driving spindle, is shown in Fig. 6 of the drawings in which the part 36 is splined to the shaft as shown and has a groove into which project pins 39. These pins extend through the arms of the yoke 37 so that they are located diametrically opposite each other. By shifting the lever 38 the disks 40 and 41 are brought into frictional engagement with the recesses in each of the pulleys 34 and 35.

In order to properly guide the belt from one to the other of said pulleys a guide pulley 42 is mounted on a bracket 43 adjustably supported on a guide 44 on the upright 10. A clamping device 45 of any well-known construction is employed to hold the bracket 43 immovable. A stud 46 from the bracket has its bearing face properly inclined so that the periphery on one side (the rear in the arrangement herein shown) of the pulley 42 is directly over the center of the pulley 35 and the periphery of the opposite side of the pulley 42 is directly over the center of the larger pulley 34.

Idler pulleys 47 and 48 are properly mounted on the column, the pulley 47 being supported by a horizontally extending arm 49 from a bracket 50 while the pulley 48 is mounted in an upwardly extending projection 51 from said bracket.

A small pulley 52 and a larger pulley 53 are each loosely mounted on the spindle 19. A clutch 54 is mounted between these pulleys, this clutch being splined to the shaft in the same manner as hereinbefore described with regard to the clutch on the driving shaft. A yoke 55 pivoted to the arm 30 and having pins 56 engaging grooves in the clutch 54 is employed for shifting the clutch into engagement with the pulleys 52 and 53. It will be understood that this clutch is in construction and operation the same as that illustrated in Fig. 6, and the latter may be in fact considered as the clutch for the spindle 19 as well as for the shaft 31.

A latch 57 having notches 58 to engage a lip 59 on the yoke 55 is employed for holding the yoke in different positions. A projection 60 from this latch receives the force from a spring 61 which is disposed to hold the latch in engagement with the yoke except when the parts are disengaged by the application of other power.

A guide pulley 62 is supported by a bracket 63 on the forward projecting part 11. This bracket has a hub 64 the bearing face of which is properly inclined to locate the pulley 62 with one side in line to deliver the belt to the pulley 52 and the opposite side of the pulley, as to its periphery, being located in proper line to receive the belt from the pulley 53. The pulley is mounted on a stud from the hub 64, said stud not being shown herein, but which may be of any well-known construction.

A belt 65 operatively connects the driving shaft 31 with the drill spindle 19, this belt extending from the larger driving pulley 34 over the idler 47 to the larger pulley 53 on the spindle. From this pulley it passes around the guide pulley 62 which guides it to the smaller pulley 52 on the spindle 19 and from thence it passes over the idler 48 which changes its direction of run and is properly located to deliver it to the small driving pulley 35. From this pulley it passes over the guide pulley 42, which is properly positioned to receive it from the pulley 35 and deliver it to the larger driving pulley 34.

The construction enables a belt to have unrestricted travel in a direct course throughout its length, that is, it is free to follow its natural course and is not deviated in any respect from such course.

In the construction as illustrated in Fig. 1 the guide pulleys 42 and 64 receive the belt from one and direct it into proper position to be naturally received by the other of the pulleys on a single shaft. In the construction shown in Fig. 2 the belt travels in a direct line from the pulley 52 to the pulley 66. The idler 72 in this case acts as the guide to receive the belt from the pulley 66 and properly position it to be received under natural conditions by the pulley 53. From this construction it will be readily seen that except for natural stretching of the belt in use no means are required to take up slack in the belt, and that the speeds of the spindle 19 may be readily changed by shifting either of the clutches into engagement with that pulley desired, the belt being undisturbed. By this arrangement the belt is so wrapped around the different pulleys that the full force applied to the belt is translated to the different parts and it is practically impossible to cause the belt to slide on any of the pulleys.

The pulleys operating in connection with the clutch are of such construction and operation that each in fact is a driving or driven pulley part of the time and at other times acts simply as an idler.

In the form of the device shown in Fig. 2 that part forward of the upright 10 and mounted on the forward extending part 11 are of exactly the same construction as shown in Fig. 1. A detailed description of these parts therefore will be omitted, reference being had to the description relating to Fig. 1 for a correct understanding of said parts. In this form of the device the clutch is omitted from the driving shaft 75 and a regular cone pulley consisting of the steps 66 and 67 is secured to the shaft which also bears a driving pulley 84. Projections 68 extend from the upright 10 to afford a bearing for the driving shaft. The belt in this form of construction is shifted in the usual manner from one to the other steps on the cone pulley, but a change of speed of the spindle is effected on the spindle the same as hereinbefore described. In order to take up the slack in the belt when a change is made on the driving cone pulley the idler 74 is mounted on a sleeve 69 adjustably supported by an arm 70 secured to a bracket 71 from the upright 10. The idler 72 is mounted on a stud 73 projecting from the side of the bracket 71. This stud extends at a proper angle to cause the pulley 72 to properly guide the belt in its delivery on to the large pulley of the spindle. The operation of this form of the device will be readily understood from a brief examination of the drawings, the belt, however, traveling in a reverse direction from that shown in the device of Fig. 1. The belt 85 extends upward and over the idler 72 and on to the left side of the large cone pulley on the spindle, as viewed in Fig. 2. The belt is presented to the spindle the same as in the device of Fig. 1, but on leaving the small cone pulley it passes over the idler 74 and to the outside of the cone pulley.

Prior to my invention, in machines of this class, when it is desired to change the belt from one to another step of the cone pulley, a set screw has been employed to hold the pulley in the different positions required to enable it, or one of the steps thereof, to properly receive the belt. This requires time and is troublesome for the reason that a wrench must be constantly at hand, and the loosening and tightening of the set screw is an inconvenient means to the end desired.

In carrying out my improvement the shaft 75 is provided with key recesses 76 and the cone pulley is splined to the shaft as plainly shown in Fig. 5. A rib 78 extends radially within the recess 77 in the pulley, and a balancing rib 79 extends across said recess opposite the rib 78. A hole 80 constituting a chamber is formed through the rib 78, extending from the periphery of the pulley, and a key pin 81 seated in the bottom of this recess has a reduced end adapted to engage the recesses 76. A spring 82 located in the chamber 80 forces the pin 81 to its seat, and a screw plug 83 closes the mouth or opening into the chamber. The side walls of the key recesses 76 are inclined slightly so that by a sufficient amount of force applied to the cone pulley in a direction lengthwise of the shaft the pin may be forced from its recess. From this construction it will be seen that when it is desired to change the position of the pulley it may be readily moved by forcing it along the shaft, the construction of the parts being sufficient to hold the pulley against movement lengthwise of the shaft in the ordinary running of the parts.

In order to avoid the employment of a fast and loose pulley on the driving shaft, as is common in machines of this general character, I mount the driving pulley 84 loosely on the shaft 75. A clutch 85 having face teeth is splined to the driving shaft, the teeth being adapted to engage teeth on the hub 86 of the driving pulley. A rod 87 having an operating handle or knob 88, projects into an opening extending lengthwise of the shaft 75. A slot 89 projects through the shaft into the opening in which the rod is located. From this it will be noted that the pulley rotates freely on the shaft, but when it is desired to drive the machine by operating the rod 87 to engage the clutch parts the pulley is locked to the shaft.

The clutch 85 is passed through an opening in the rod 87 and is suitably held therein. The rod 87 has a head 90 located in a recess 91, which construction permits the knob 88 to be held against rotation when the clutch is put into operation.

In Fig. 7 of the drawings a slightly modified form of clutch is shown in which a sleeve 94 is splined to the shaft 92. This sleeve has at its end a clutch 97 to engage a clutch 98 on the hub of the wheel 84. This wheel is the same in the construction as shown in Figs. 2 and 3 of the drawings. The rod 95 has a toe 96 engaging a groove circumferentially formed on the inner surface of the sleeve 94, as plainly shown. The shaft 92 is provided with recesses 93 for the reception of the key pin on the cone pulley, the construction and operation of which is the same as shown and described with respect to Figs. 2 and 3.

What I claim as my invention and desire to secure by Letters Patent is:—

1. A driving shaft, means for rotating it, a driven shaft, a plural number of devices for receiving a flexible connection said devices being operatively mounted with respect to one of said shafts, a device for receiving the flexible connection and operatively mounted with respect to the other shaft, the flexible connection between said devices and engaging all of the devices on a single shaft, and means for guiding the connection to allow it unrestricted travel in the same direction on all of said devices.

2. A driving shaft, means for rotating it, a driven shaft, a plural number of devices for receiving a flexible connection said devices being operatively supported with respect to the driven shaft, means for receiving a flexible connection loosely mounted on the driving shaft, the flexible connection between said devices, and means for guiding said connection to allow it unrestricted travel in the same direction on all of said devices.

3. A driving shaft, means for rotating it, a driven shaft, a plural number of devices for receiving a flexible connection said devices being operatively mounted with respect to one of said shafts, a device for receiving a flexible connection operatively mounted with respect to the other shaft, the flexible connection between said devices, and a guide to allow said connection unrestricted travel in the same direction about all of said devices.

4. A driving shaft, means for rotating it, a driven shaft, a plural number of devices for receiving a flexible connection said devices being operatively supported with respect to one of said shafts and including a device mounted to rotate independently thereof, a device for receiving a flexible connection operatively mounted with respect to the other shaft, the flexible connection between said devices, and means to guide said connection with unrestricted movement in a direct line to all of said devices to rotate them all in the same direction.

5. A driving shaft, means for rotating it, a driven shaft, loosely mounted devices for receiving a flexible connection operatively supported with respect to one of said shafts, means for securing a device to rotate with its shaft, means for receiving a flexible connection operatively mounted with respect to the other shaft, the flexible connection between said devices and engaging each device appurtenant to a single shaft, and means for guiding said connection with unrestricted movement and in a direct line to travel in the same direction on all of said devices.

6. A driving shaft, means for rotating it, a driven shaft, loosely mounted devices of different diameters operatively mounted with respect to one of the shafts, means for securing a device to rotate with its shaft, a device for receiving a flexible connection operatively mounted with respect to the other shaft, the flexible connection between said devices and engaging each of the devices appurtenant to a single shaft, and means for guiding said connection with unrestricted movement and in a direct line to travel in the same direction on all said devices.

7. A driving shaft, means for rotating it, a driven shaft, loosely mounted devices of different diameters operatively supported with respect to one of said shafts, means for securing each of the devices to rotate with said shaft, a device for receiving a flexible connection mounted appurtenant to the other shaft, the flexible connection between said devices and in engagement with all of said devices appurtenant to a single shaft, and means for guiding said connection with unrestricted movement and in a direct line to travel in the same direction on all of said devices.

8. A driving shaft, means for rotating it, a driven shaft, loosely mounted devices for receiving a flexible connection operatively mounted with respect to one of said shafts, means for connecting each of said devices to rotate with said shaft, a single operating device for said connecting means, a device for receiving a flexible connection operatively mounted with respect to the other shaft, the flexible connection between said devices, and engaging each appurtenant to a single shaft, and means for guiding said connection with unrestricted movement in a direct line to travel in the same direction on all of said devices.

9. A driving shaft, means for rotating it, a driven shaft, loosely mounted devices for receiving a flexible connection operatively mounted with respect to one of said shafts, a clutch located between said devices and movable in opposite directions to connect them to rotate with the shaft, a device for receiving a flexible connection operatively mounted with respect to the other shaft, the flexible connection between said devices and engaging each of said loosely mounted devices, and a guide to receive said connection from one and guide it to another of said loosely mounted devices to travel in the same direction on all.

10. A driving shaft, means for rotating it, loosely mounted devices for receiving a flexible connection operatively mounted with respect to said shaft, means for connecting said devices to rotate with said shaft, a driven shaft, loosely mounted devices for receiving a flexible connection mounted with respect to the driven shaft, means for connecting said devices to rotate with the driven shaft, the flexible connection between said devices, and means appurtenant to each of said shafts for guiding the connection with unrestricted movement and in a direct line to cause all of said devices to travel in the same direction.

11. A driving shaft, means for rotating it, a driven shaft, loosely mounted devices for receiving a flexible connection operatively mounted with respect to one of said shafts, means for connecting a device to rotate with its shaft, devices of different diameters operatively mounted with respect to the other shaft, the flexible connection between said devices, and a guide for directing the connection with unrestricted movement and in a direct line to each of the loosely mounted devices to travel in the same direction on all.

12. A driving shaft, means for rotating it, a driven shaft, loosely mounted devices for receiving a flexible connection operatively mounted with respect to one of said shafts, means for connecting a device to rotate with its shaft, loosely mounted devices for receiving a flexible connection and of different diameters operatively mounted with respect to the other shaft, means for connecting one of said devices to rotate with its shaft, the flexible connection between said devices and in engagement with each on a single shaft, a guide for directing the connection to the devices on one of the shafts, and a guide for directing said connection to travel in the same direction on all of the devices appurtenant to the other shaft.

13. A driving shaft, means for rotating it, a driven shaft, a plural number of devices of different diameters loosely mounted on each of said shafts, means for connecting a device to rotate with its shaft, the flexible connection between said devices, and means appurtenant to each shaft for guiding the connection with unrestricted movement and in a direct line to the devices thereon and to travel in the same direction on all of said devices.

14. A driving shaft, means for rotating it, loosely mounted devices for receiving a flexible connection operatively mounted with respect to said shaft, means for connecting each of the devices to rotate with its shaft, means for guiding the flexible connection to said devices, a driven shaft, loosely mounted devices of different diameters operatively mounted with respect to said shaft, means for connecting each of said devices to rotate with the driven shaft, means for guiding said connection to each of the devices on the driven shaft to travel in the same direction on all, and the flexible connection in engagement with each of said devices appurtenant to the driving and driven shafts.

15. A driving shaft, means for rotating it, a plural number of loosely mounted devices for receiving a flexible connection operatively mounted with respect to said shaft, a clutch located between said devices to connect each to rotate with said shaft, a guide to receive the connection from and guide it to the other of said devices, a driven shaft, a plural number of loosely mounted devices for receiving a flexible connection operatively supported in connection with the driven shaft, a clutch mounted between said devices to connect them to rotate with the driven shaft, the flexible connection between said devices, and a guide to receive the connection from and guide it to the other of said devices on the driven shaft to travel in the same direction on all thereof.

16. A column for a machine including an upright and a forwardly extending part, a driving shaft mounted on the upright, means for rotating said shaft, a driven shaft mounted in said forwardly extending part, pulleys loosely mounted on one of said shafts, means for connecting a pulley to rotate with its shaft, an idler pulley for changing the direction of run of a connection, a rigidly mounted guide pulley to guide said connection to said loosely mounted pulleys, means for adjusting a pulley to relieve the looseness in the connection, and a flexible connection between said shafts and engaging each of the loosely mounted pulleys.

17. A column for a machine including an upright and a forwardly extending part, a driving shaft mounted on the upright, means for driving said shaft, a driven shaft mounted in the forwardly extending part, pulleys of different diameters loosely mounted on one of said shafts, means for connecting said pulleys to rotate with their shaft, a flexible connection between said shafts and in engagement with each of the loosely mounted pulleys, an idler pulley for changing the direction of run of said connection, a rigidly mounted guide pulley for guiding said connection to the loosely mounted pulleys, one of said guide or idler pulleys being adjustably mounted to relieve looseness of said connection.

18. A column for a machine including an upright and a forwardly extending part, a driving shaft mounted on the upright, means for driving the shaft, a driven shaft mounted in the forwardly extending part, pulleys of different diameters loosely mounted on one of said shafts, a clutch located between said pulleys for connecting each to rotate with its shaft, a flexible connection between said shafts and in engagement with each of the loosely mounted pulleys, an idler pulley for changing the direction of run of said connection, a guide pulley for guiding the connection to the loosely mounted pulleys, one of said idler or guide pulleys being adjustably mounted to relieve looseness of the connection.

19. A column for a machine including an upright and a forwardly extending part, a driving shaft mounted on the upright part, means for driving said shaft, a spindle mounted in the forwardly extending part, pulleys of different diameters loosely mounted on said spindle, a clutch located between said pulleys for connecting each to rotate with the spindle, a flexible connection between the driving shaft and spindle and in engagement with each of said pulleys, an idler pulley adjustably mounted on the column and arranged to change the direction of run of said connection, and a guide pulley for guiding the connection to the loosely mounted pulleys.

20. A driving shaft, means for rotating it, a driven shaft, a plural number of devices mounted with their axes coincident with the axis of one of said shafts, a device to receive a flexible connection mounted appurtenant to the other shaft, and means for guiding said flexible connection with unrestricted movement and in a direct line to all of said devices to travel in the same direction thereon.

21. A driving shaft, means for rotating it, a driven shaft, a plural number of means for receiving a flexible connection operatively supported with respect to one of said shafts, means for receiving a flexible connection, said means being loosely mounted with respect to the other shaft, the flexible connection between said devices, and means for guiding said connection with unrestricted movement and in a direct line to cause it to travel in the same direction on all of said devices.

22. A driving shaft, means for rotating it, a driven shaft, a plural number of loosely mounted devices for receiving a flexible connection said devices being operatively supported with respect to one of the shafts, a device for receiving a flexible connection said device being operatively supported with respect to the other shaft, means for connecting a loosely mounted device to rotate with its shaft, the flexible connection between said devices, and means for guiding said connection with unrestricted movement and in a direct line to cause it to travel in the same direction on all of said devices.

23. A driving shaft, means for rotating it, a driven shaft, a plural number of loosely mounted devices for receiving a flexible connection said devices being operatviely supported with respect to one of said shafts, a loosely mounted device for receiving a flexible connection said device being operatively mounted with respect to the other shaft, means for connecting a loosely mounted device to rotate with each of said shafts, the flexible connection between said devices, and means for guiding said connection with unrestricted movement and in a direct line to cause it to travel in the same direction on all of said devices.

24. A driving shaft, means for rotating it, a driven shaft, a plural number of loosely mounted pulleys operatively supported with respect to one of said shafts, means for connecting said pulleys to rotate with said shaft, a pulley operatively mounted with respect to the other shaft, a belt passing between said pulleys, and means for guiding said belt with unrestricted movement and in a direct line to cause it to travel in the same direction on all of said pulleys.

25. A driving shaft, means for rotating it, a driven shaft, a plural number of loosely mounted pulleys of different diameters operatively supported with respect to one of said shafts, a pulley operatively supported with respect to the other shaft, a belt passing between said pulleys, and means for guiding said belt with unrestricted movement and in a direct line to cause it to travel in the same direction on all of said pulleys.

26. A driving shaft, means for rotating it, a driven shaft, a plural number of pulleys of different diameters operatively mounted with respect to each of said shafts and including loosely mounted pulleys appurtenant to a single shaft, means for connecting said pulleys to rotate with their shaft, a belt passing around the pulleys appurtenant to each shaft, and means for guiding said belt with unrestricted movement and in a direct line to cause it to travel in the same direction on all of said devices.

27. A driving shaft, means for rotating it, a plural number of pulleys operatively mounted with respect to one of said shafts and including a pulley mounted to rotate independently thereof, a pulley operatively mounted with respect to the other shaft, a belt passing around the pulleys appurtenant to each shaft and in contact with all on a single shaft, and means for guiding said belt with unrestricted movement and in a direct line to cause it to travel in the same direction on all of said pulleys.

28. A driving shaft, means for rotating it, a pulley operatively mounted with respect thereto, a driven shaft, pulleys operatively mounted with respect thereto and including a pulley mounted to rotate independently thereof, a belt operatively connecting said pulleys, and means for guiding said belt with unrestricted movement and in a direct line to cause it to travel in the same direction on all of said pulleys.

29. A driving shaft, means for rotating it, a driven shaft, a plural number of devices of different diameters operatively mounted with respect to one of said shafts, a device for receiving a flexible connection and operatively mounted with respect to the other shaft, the flexible connection between said devices and engaging all of the devices on a single shaft, and means for guiding the connection with unrestricted movement and in a direct line to cause it to travel in the same direction on all of said devices.

30. A driving shaft, means for rotating it, a driven shaft, a plural number of devices of different diameters operatively mounted with respect to one of said shafts and including a device mounted to rotate independently thereof, a device for receiving a flexible connection and operatively mounted with respect to the other shaft, the flexible connection between said devices and engaging all of the devices on a single shaft, and means for guiding the connection to cause it to travel in the same direction with unrestricted movement and in a direct line on all of said devices.

31. A driving shaft, means for rotating it, a driven shaft, a plural number of devices for receiving a flexible connection operatively mounted with respect to one of said shafts, a device for receiving a flexible connection and operatively mounted with respect to the other shaft, the flexible connection having a single strand passing but once back and forth between said devices and engaging all of the devices on a single shaft, and means for guiding the connection with unrestricted movement and in a direct line to travel in the same direction on all of said devices.

32. A driving shaft and a driven shaft arranged one at an angle to the other, means for rotating the driving shaft, a plural number of devices for receiving a flexible connection operatively mounted with respect to one of said shafts, a device for receiving said connection and operatively mounted with respect to the other shaft, the flexible connection between said devices and engaging all of the devices on a single shaft, and means for guiding said connection with unrestricted movement and in a direct line to cause it to travel in the same direction on all of said devices.

33. A driving shaft and a driven shaft arranged at an angle one with respect to the other, means for rotating the driving shaft, a plural number of devices for receiving a flexible connection operatively mounted with respect to one of said shafts, a device for receiving the flexible connection and operatively mounted with respect to the other shaft, means for changing the direction of the flexible connection from one to the other of said shafts, the flexible connection between said shafts and engaging all of the devices on a single shaft, and means for guiding said connection with unrestricted movement and in a direct line about all of the devices in contact therewith to cause it to travel in the same direction on all.

34. The combination of two co-acting shafts suitably supported and set at an angle to each other, a plural number of devices adapted to receive a flexible connection and operatively mounted on each shaft, the flexible connection and means to cause said connection to travel freely, unrestrictedly, and in a continuous direction as it is received upon and delivered from each and all of said devices appurtenant to a single shaft.

35. Two co-acting shafts suitably supported, devices of different diameters mounted on each, a flexible connection engaging each and all of said devices, and means located intermediate said shafts whereby the connection is caused to travel unrestrictedly and in a continuous direction on all of said devices appurtenant to one of said shafts and in a line parallel to the plane of rotation as it is received upon and delivered from each of said devices.

36. Two co-acting shafts suitably supported, devices of different diameters mounted on each, a flexible connection engaging each and all of said devices, and means for causing said connection to travel unrestrictedly and in a continuous direction and in a line parallel to the plane of rotation of all of the devices to which it is delivered and from which it leads.

37. The combination of two suitably supported co-acting shafts, a plural number of devices operatively mounted on each shaft, a flexible connection in engagement with each of the devices on each shaft, and means to cause said connection to travel freely and in a continuous direction as it is received upon and delivered from each of the devices mounted upon a single shaft.

CHARLES B. ELMORE.

Witnesses:
   ARTHUR B. JENKINS,
   LENA E. BERKOVITCH.